UNITED STATES PATENT OFFICE.

WILLIAM WELLHOUSE AND ERWIN HAGEN, OF ST. LOUIS, MISSOURI, ASSIGNORS TO SAID WELLHOUSE, AMOS F. HOFFER, AND JOSEPH P. CARD, OF SAME PLACE, ONE-THIRD TO EACH.

IMPROVEMENT IN PRESERVING WOOD.

Specification forming part of Letters Patent No. 216,589, dated June 17, 1879; application filed March 17, 1879.

*To all whom it may concern:*

Be it known that we, WILLIAM WELLHOUSE and ERWIN HAGEN, residents of the city of St. Louis, Missouri, have jointly made a new and useful Improvement in Preserving Wood, of which the following is a full, clear, and exact description.

The present improvement has relation to the materials used in treating the wood and the mode of retaining the preservative within the wood.

We employ chloride of zinc, gelatine, and tannin, and as follows: The chloride of zinc and gelatine are first introduced into the wood, and afterward the tannin is introduced.

If desired, the chloride of zinc and gelatine can be introduced separately; but to simplify the operation we preferably combine them in one solution, and inject them at the same time.

The action of the chloride of zinc is well understood from its use in the Burnettizing process, the material serving to preserve the wood from decay.

The office of the gelatine is to toughen the wood, and also to close the pores of the wood, and to hold the chloride of zinc within the wood, so that it will not drain or wash out.

The tannin is used to render the gelatine insoluble, for upon being introduced into the wood it acts upon the gelatine in the usual manner, converting it into a leathery substance unaffected by moisture.

The compound thus formed from the gelatine and tannin not only serves to close the pores at and near the surface of the wood, but also throughout the same. The effect is both to fix the chloride of zinc within the wood, so that it cannot leave the wood, and to render the wood firmer, tougher, and stronger throughout.

The process in detail is, preferably, as follows: Take the wood as soon after it is cut as is practicable; inclose it in a suitable cylinder, create a vacuum therein, and extract the sap from the wood, all in the usual manner. Then, by the customary method, introduce into the wood the chloride of zinc and gelatine in the form of a solution, the proportions, preferably, being, by weight, three parts of chloride of zinc and three parts of gelatine to ninety-four parts of water. Before introducing the tannin, the water of the first solution is, preferably, extracted from the wood, which may be effected in any preferable mode. The tannin, in the form of a solution, of any desired strength for acting upon the gelatine, is then injected into the wood.

Ordinary glue can be used as a desirable form of gelatine, and the tannin can be most readily obtained from sumac.

The glue, without the tannin is valuable in hardening and strengthening the wood.

We are aware, in preserving wood, that chloride of zinc and gelatine have been used in combination.

We claim—

The process of saturating and preserving wood, which consists in subjecting the wood first to a solution of chloride of zinc and gelatine, and afterward to a solution of tannin to close the pores of the same, substantially as described.

WM. WELLHOUSE.
      ERWIN HAGEN.

Witnesses:
 CHAS. D. MOODY,
 L. L. WALBRIDGE.